2,926,117
PAPER PRODUCT CONTAINING ANIONIC POLYAMIDE RESIN SUSPENSOID

Harold Wittcoff, Minneapolis, Minn., assignor to General Mills, Inc., a corporation of Delaware No Drawing. Application May 18, 1953
Serial No. 355,866

7 Claims. (Cl. 162—168)

The present invention relates to a novel paper product and to the process of producing the same involving the use of anionic polyamide resin suspensoids as beater additives. These colloidally dispersed anionic aqueous suspensions of film-forming polyamide resin polymers are added as wet end additives and preferably are used with the addition of alum, rosin size, or other commonly employed additives to produce products displaying improved wet strength, dry strength and water-proofing characteristics.

Some colloidally dispersed film-forming resinous polymers, especially those which are cationic, have been used heretofore but are preferably employed without the addition of alum, rosin, or other additives. This entails certain disadvantages in the paper mill. For example, many paper mills employ as part of the make-up, various waste paper products which in practically every case contain alum. Thus, if the beater additive is sensitive to alum, either it cannot be used or precaution must be taken to insure that the pulp is free from alum. Even where the pulp is free from alum, however, the vats, beaters and other equipment ordinarily employed for the production of paper may be contaminated with alum and this alum may thus enter the pulp which was originally free from alum. The present compositions, therefore, which are preferably used in the presence of alum represent a distinct improvement over the cationic material. Furthermore, the alum serves to precipitate the anionically dispersed material of the present invention and thus produces a degree of size or water resistance which cannot be obtained in any other way. Virtually all of the cationic beater additives now available on the market regardless of whether they are used with alum or without provide wet strength paper with very poor size characteristics. The composition of the present invention not only preserves the wet strength, but also produces highly sized sheets, as will be apparent from the examples given herein.

Another advantage of the present invention lies in the fact that the cationic material employed to effect dispersion of the anionic material may be a volatile material such as ammonium or morpholinium compounds. During the heat treatment ordinarily employed in the later stages of the fabrication of paper, ammonia or morpholine may be volatilized and the ionic system which initially supported the dispersion is destroyed. If these cationic materials are not vaporized, the ionic system obviously is somewhat hydrophilic and reduces the water resistance of the sheet. By vaporizing the cationic material, the hydrophilic characteristics of the additive are destroyed and the sheet thus produced is highly resistant to water absorption.

It is, therefore, an object of the present invention to provide a novel paper product containing, as a beater additive, a colloidally dispersed anionic aqueous suspension of film-forming polyamide resin polymers.

It is a further object of the invention to provide a process of making paper which involves the use of the above dispersions as wet end additives.

The suspensoids employed in the present invention are derived from polyamides prepared from polymeric fat acids and polyalkylene polyamines such as diethylene triamine, triethylene tetramine, tetraethylene pentamine, etc. Polyamides prepared from these reactants are disclosed in my co-pending application U.S. Serial No. 291,067, filed May 31, 1952, of which the present application is a continuation in part. As was pointed out above, the polyamides are derived from polymeric fat acids, such as the polymerized fatty acids resulting from the polymerization of drying or semidrying oils, or from the polymerization of the free acids or simple aliphatic alcohol esters of the acids of such oils as linseed, tung, perilla, oiticica, cottonseed, corn, tall, sunflower, safflower, dehydrated castor oils and the like. In the polymerization process the fatty acid with sufficient double bond functionality combined for the most part probably by a Diels-Alder mechanism to provide a mixture of dibasic and higher polymeric acids. The acids with insufficient functionality to react remain as monomers and may be removed by distillation. The residue after distillation consists of the desired polymeric acids and this mixture is used for the preparation of the polyamide resins by reaction with the polyamine. Ordinarily, polyamides of this type have relatively low molecular weights and are largely monomeric in nature, although some polymeric products may be present.

For purposes of the present invention, it is essential that the product have a high acid number which may be due either to the employment of a substantial excess of the polymeric fat acid or to incomplete reaction. The product should have an acid number of at least 50, and the acid number may be as high as 200. Acid numbers within the range of 75 to 100 are preferred.

The polyamides are dispersed in an aqueous medium by means of salt groups which are formed by a reaction of the free carboxyl groups in the polyamide with a base, preferably an organic base such as ammonia, morpholine, and the like. The quantity of base which is employed is usually only a part of the quantity which would be required to completely neutralize the acid number; usually a quantity equivalent to an acid number of 25 to 50 is sufficient.

The dispersion process may be carried out by simply mixing the resin with an aqueous alkali and heating the mixture to a temperature above the melting point of the resin and by thoroughly agitating the mixture. The resin disperses readily to form a stable suspensoid. It is also possible to melt the resin separately and to stir it into a heated aqueous alkaline solution. While inorganic bases such as sodium, potassium, hydroxide, and carbonates may be used, organic bases such as monoamines, particularly aliphatic monoamines, morpholines, triethanolamine, pyridine, triazole, diethanolamine, ethanolamine, ethylene diamine, diethylene triamine, triethylene tetramine, choline and a great variety of ammonium bases may be employed.

Of particular interest for the present invention is the polyamide material which results from the condensation of two moles of dimeric vegetable oil acids and one mole of diethylene triamine. This provides a composition with an acid number in the range of 80–90. The dispersion is effected by means of morpholine in the quantity essential to neutralize approximately one half of the acid content. The product thus obtained is an extremely stable dispersion capable of great dilution which is particularly important where the dispersion is added as a beater additive and thus is subjected to great dilution.

The compositions employed in the present invention may be used in combination with other additives commonly used in the fabrication of paper, including rosin size, paraffin, rubber latices such as neoprene latex and numerous other resin dispersions. Generally the suspensoids may be used in the fabrication of paper within the range of 1-20%. For the most part, however, from 3-6% of the suspensoid based on the weight of the pulp fiber is adequate to obtain the desired results. The polyamide resin additive may be employed without alteration of the usual paper making procedure. If practical, however, the sheet should be dried in the region above the boiling point of water. Thus excellent results are obtained when temperatures between 240 and 280° F. are employed in the drier, although such high temperatures are by no means essential.

*Example 1*

A polyamide resin containing free carboxyl groups was prepared from a polymeric fat acid having the following composition:

| | |
|---|---|
| Percent monomer | 10.0 |
| Percent dimer | 69.5 |
| Perment trimer | 20.5 |
| Acid number | 186.5 |
| Saponification equivalent | 291.1 |

A mixture of 1455 parts of this polymeric fat acid and 90 parts of 95.6% diethylene triamine was heated to 200° C. at a rate such that the temperature of the vapor escaping from the reaction mixture did not exceed 100° C. The reaction mixture was heated to 200° C. and was maintained there for three hours. During the last hour vacuum was applied. The product had the following properties:

| | |
|---|---|
| Melting point (ball and ring) °C | 27 |
| Color (Gardner) | 10-11 |
| Viscosity (Gardner-Holdt) | A-2 to A-3 |
| Acid number | 86.5 |
| Amine number | 4.3 |

Viscosity and color was measured on 35% solutions in toluene-butanol (1:1).

In order to disperse the above described material, 350 parts of it were heated to 140-150° C. Thereafter, a solution of morpholine (23.1 parts) in water (371 parts) was heated to 90° C. and the morpholine-water solution was added in small increments to the stirred resin until foaming stopped. Thereafter, approximately one half of the remainder of the morpholine-water solution was added with very high speed stirring and a few minutes later the remainder of the solution was added. High speed stirring was continued for a short while thereafter to provide a viscous, extremely stable dispersion, which was diluted with tap water to a solids concentration of 37.8%. This dispersion had a pH of 7.98 and an acid number of 28.5.

In two experiments the suspensoid described above was added directly to a bleached sulfite pulp in the beater at the rate of 3% and 6% suspensoid solids based on the weight of the dry fiber. At the same time, 4% of alum based on the weight of the dry fiber was also added to the beater. The sheets were formed in the normal way after the normal drying period, these sheets were cured for from 10-20 minutes by heating at 240-280° F. Examination of the drained water indicated that retention of the suspensoids was excellent.

The sheet obtained with 3% of the beater additive had a wet tensile strength of 370 g., whereas the sheet containing 6% of the additive had a wet tensile strength of 440 g. By way of comparison a blank sheet, that is a sheet prepared without any beater additives whatsoever, demonstrated a wet tensile strength of 100. For this test the sheets (15 mm. wide) were wetted with the aid of a wetting agent, sodium lauryl sulfate. The improvement in wet tensile strength is thus obvious.

Not only was wet tensile strength increased, but also the size characteristics of the sheets as measured by two different tests were markedly improved. The first test for measuring water resistance of these sheets was a standard TAPPI test designated T433 M-44. In this test a blank sheet, that is a sheet prepared without any resin additive whatsoever demonstrated a time resistance to wetting of one second. The sheet containing 3% of the polyamide resin suspensoid demonstrated a time resistance of 100 seconds, whereas the sheet containing 6% demonstrated a time resistance of 70 seconds. Still another and simpler test for determining degree of size is simply to place a drop of water on the surface of the paper and measure the length of time necessary for impregnation. With a blank sheet the drop of water impregnated the paper within one second. With the sheets containing both 3 and 6% resin the drop of water did not impregnate the paper in a period of 7200 seconds, at which time observation was discontinued.

*Example 2*

A suspensoid was prepared from the resin described in Example 1 by the procedure indicated in Example 1, with the exception that one half the quantity of morpholine was used. This too provided a stable dispersion. The suspensoids prepared in this way were incorporated into the beater as described in Example 1 and sheets were prepared as indicated there.

Whereas the blank sheet had a wet tensile strength of 100 g., the sheet prepared with 3% polyamide resin additive had a wet tensile strength of 320 g. and the sheet prepared with 6% had a wet tensile strength of 600 g. By the TAPPI size test referred to above the sheet containing 3% of the resin additive had a resistance indicated by the value of 69 seconds, whereas the sheet containing 6% of the resin additive had a time resistance of 72 seconds. In the size test where a drop of water is placed on the surface of the paper, both sheets were not wetted after 120 minutes. At this time observation was discontinued. As in the previous example, both of these sheets were prepared with 4% of alum.

*Example 3*

A suspensoid was prepared from the resin described in Example 1 by the procedure indicated in that example, save that 0.8% ammonia, based on the weight of the resin used, was substituted for the morpholine. Here too an entirely stable dispersion resulted which was capable of great dilution. This dispersion was incorporated into sheets by the procedure described in Example 1 at levels of 3% and 6% based on the dry fiber content. Again 4% of alum was used. The wet tensile strength of the sheet containing 3% of the resin additive was 463 g., whereas the wet tensile strength of the sheet containing 6% of the resin additive was 560 g. This may be contrasted with the value of 100 g. obtained for the blank sheet. In the size test in which a drop of water is placed on the surface, no wetting was observed during the period of 120 minutes. Thereafter observation was discontinued. In the TAPPI test both sheets indicated a resistance of 79 seconds. These values for the size of the sheets may be compared with values of 1 second for the blank sheet.

*Example 4*

A dispersion was prepared employing 50 parts of the polyamide resin described in Example 1, 2.5 parts of paraffin wax, 3.3 parts of morpholine and 56 parts of water. The procedure used was the procedure described in Example 1, the paraffin wax and the resin having been melted together prior to the addition of the water. Sheets were prepared from this suspensoid by the procedure described in Example 1 using 3% of the resin and 4% and 5% respectively of alum. The wet tensile strength of the sheet containing 4% alum and 3% resin was 563 g. whereas the wet tensile strength of the sheet containing 3% resin and 5% alum was 687 g. These values may be compared to a value of 100 g. for the blank sheet. In the TAPPI size test the sheet with 4% alum+3% resin demonstrated a size resistance of 54 seconds, whereas the sheet with 5% alum+3% resin demonstrated a size resistance of 47 seconds. This may be contrasted to 1 second for the blank sheet. In the drop size test the sheets were not wetted in two hours, at the end of which time observation was discontinued. The blank sheet was wetted immediately in this test.

*Example 5*

In this experiment the suspensoid described in Example 1 was used in combination with ordinary rosin size. Three percent of the polyamide resin as the suspensoid was used based on the weight of the fiber. In addition, 2% of rosin size was used and in three different experiments the alum content was varied—2, 4 and 5% of alum having been used. These three sheets had wet tensile strengths of 747 g., 970 g., and 873 g. respectively, as compared to the value of 100 g. for a blank sheet. These sheets in the TAPPI size test demonstrated a resistance of 49 seconds, 66 seconds, and 64 seconds respectively as compared to a value of 1 second for a blank sheet. In the drop size test, the sheets were not wetted in two hours as compared to immediate wetting in a blank sheet.

I claim as my invention:

1. A process of producing a paper product which comprises adding to paper pulp as a beater additive alum and an anionic suspensoid in an aqueous medium of a polyamide, which is the reaction product of polymeric fat acid and a polyalkylene polyamine, the polyamide being employed in the proportion of from 1 to 6%, based on the weight of the pulp solids and having a molecular weight within the approximate range of 1000 to 10,000 and the polyamide having an acid number of from 50 to 200, and being dispersed in the aqueous medium by means of an alkaline substance to produce a staple suspensoid, and converting said pulp into a paper product.

2. The process according to claim 1 in which the polyamide is the reaction product of polymeric fat acids and diethylene triamine.

3. The process according to claim 1 in which the alkaline material is an organic alkaline material which is readily vaporizable.

4. The process of preparing paper products which comprises adding to the paper pulp as a beater additive alum and an anionic suspensoid in an aqueous medium of a polyamide which is the reaction product of polymeric fat acids and diethylene triamine, the polyamide being employed in the proportion of from 1–6% based on the weight of the pulp solids and having a molecular weight within the approximate range of 1,000–10,000 and having an acid number of from 75–100, the polyamide being dispersed in an aqueous medium by means of a volatile nitrogenous base, converting said pulp into a paper product and curing the paper product for from 10–20 minutes at 240–280° F.

5. A paper product having dispersed substantially uniformly among the fibers the precipitation product of alum and a polyamide which is the reaction product of polymeric fat acids and a polyalkylene polyamine, the polyamide having a molecular weight within the approximate range of 1,000–10,000 and having an acid number of from 50 to 200, the paper product containing from 1–6% of said polyamide based on the weight of the paper.

6. A paper product as defined in claim 5 in which said paper product contains from 3 to 6% of said polyamide based on the weight of the paper.

7. A paper product as defined in claim 6 in which said polyamide has an acid number within the approximate range 75–100.

References Cited in the file of this patent

UNITED STATES PATENTS

| | | |
|---|---|---|
| 2,325,302 | Britt | July 27, 1943 |
| 2,338,602 | Schur | Jan. 4, 1944 |
| 2,379,413 | Bradley | July 3, 1945 |
| 2,435,478 | Teeter et al. | Feb. 3, 1948 |
| 2,450,940 | Cowan et al. | Oct. 12, 1948 |
| 2,451,212 | Gold | Oct. 12, 1948 |
| 2,484,416 | Martin | Oct. 11, 1949 |
| 2,630,397 | Cowen et al. | Mar. 3, 1953 |
| 2,557,299 | Lehr et al. | June 19, 1951 |
| 2,641,593 | Teeter et al. | June 9, 1953 |
| 2,686,121 | Latham et al. | Aug. 10, 1954 |
| 2,767,089 | Renfrew et al. | Oct. 16, 1956 |

OTHER REFERENCES

Polyamide Resin Suspensoids Revision D; publication by General Mills, Inc., Minneapolis, October 20, 1950, pp. 1–16 relied upon.